US009492941B2

(12) United States Patent
Mace et al.

(10) Patent No.: US 9,492,941 B2
(45) Date of Patent: Nov. 15, 2016

(54) APPARATUS HAVING A TOOL ON AN ELONGATE POLE

(75) Inventors: William B. Mace, Spring Grove, IL (US); Ronald A. Carlson, Elgin, IL (US); Daniel J. DeLay, Muskego, WI (US); Benjamin R. Lloyd, Cudahy, WI (US)

(73) Assignee: Echo, Incorporated, Lake Zurich, IL (US)

(*) Notice: Subject to any disclaimer, the term of this patent is extended or adjusted under 35 U.S.C. 154(b) by 2159 days.

(21) Appl. No.: 11/983,332

(22) Filed: Nov. 8, 2007

(65) Prior Publication Data

US 2009/0119933 A1    May 14, 2009

(51) Int. Cl.
*A01G 3/08*    (2006.01)
*B23D 57/02*   (2006.01)
*B27B 17/00*   (2006.01)
*H01H 3/20*    (2006.01)
*B25G 1/04*    (2006.01)
*B25F 5/02*    (2006.01)

(52) U.S. Cl.
CPC ............. *B27B 17/0008* (2013.01); *A01G 3/08* (2013.01); *A01G 3/085* (2013.01); *A01G 3/086* (2013.01); *B23D 57/023* (2013.01); *B25G 1/04* (2013.01); *H01H 3/20* (2013.01); *B25F 5/02* (2013.01)

(58) Field of Classification Search
CPC ........ A01G 3/08; A01G 3/085; A01G 3/086; A01G 3/088; A01D 34/902; A01D 2034/907; B25F 5/02; B25G 1/04; B27B 17/0008; H01H 3/20; B23D 57/023
USPC ........................ 30/296.1, 275.4, 517, DIG. 1; 200/43.17, 321, 322, 332.2
See application file for complete search history.

(56) References Cited

U.S. PATENT DOCUMENTS

| 1,929,662 | A  | * | 10/1933 | Wappat .................... 200/332.2 |
| 3,780,246 | A  | * | 12/1973 | Beckering et al. ........ 200/43.17 |
| 3,952,239 | A  | * | 4/1976  | Owings et al. ............... 320/113 |
| 4,050,003 | A  | * | 9/1977  | Owings et al. ............... 320/113 |
| 4,654,971 | A  | * | 4/1987  | Fettes et al. .................. 30/383 |
| 4,900,881 | A  | * | 2/1990  | Fischer ..................... 200/61.85 |
| 5,577,600 | A  | * | 11/1996 | Schoene et al. ........... 200/43.17 |
| 5,638,945 | A  | * | 6/1997  | Fukinuki et al. .......... 200/43.17 |
| 6,181,032 | B1 | * | 1/2001  | Marshall et al. ............. 307/150 |
| 6,735,873 | B2 |   | 5/2004  | Langhans et al. |
| 7,752,760 | B2 | * | 7/2010  | Baskar et al. .................. 30/517 |
| 2003/0188435 | A1 | * | 10/2003 | Ellson et al. .................... 30/276 |
| 2008/0196256 | A1 | * | 8/2008  | Gieske et al. ............... 30/277.4 |
| 2009/0064504 | A1 | * | 3/2009  | Kodama et al. ............. 30/296.1 |

* cited by examiner

*Primary Examiner* — Clark F Dexter
(74) *Attorney, Agent, or Firm* — Wood, Phillips, Katz, Clark & Mortimer

(57) ABSTRACT

A powered apparatus having an elongate pole with a tool at a proximal region and a drive for operating the tool. A first operating component is repositionable between first and second positions to change a state of the drive. A second operating component is repositionable between: a) a locked position; and b) a released position wherein the first operating component can be changed from the first position into the second position. A handle assembly has a gripping portion with an extent that can be grasped by the user's one hand at a plurality of different locations along the extent of the gripping portion to control the operating components, including at a first location in a manner wherein with the elongate pole vertically oriented, a majority of a vertical weight force component of the apparatus is directed generally parallel to the length of a user's forearm below the user's one hand.

24 Claims, 9 Drawing Sheets

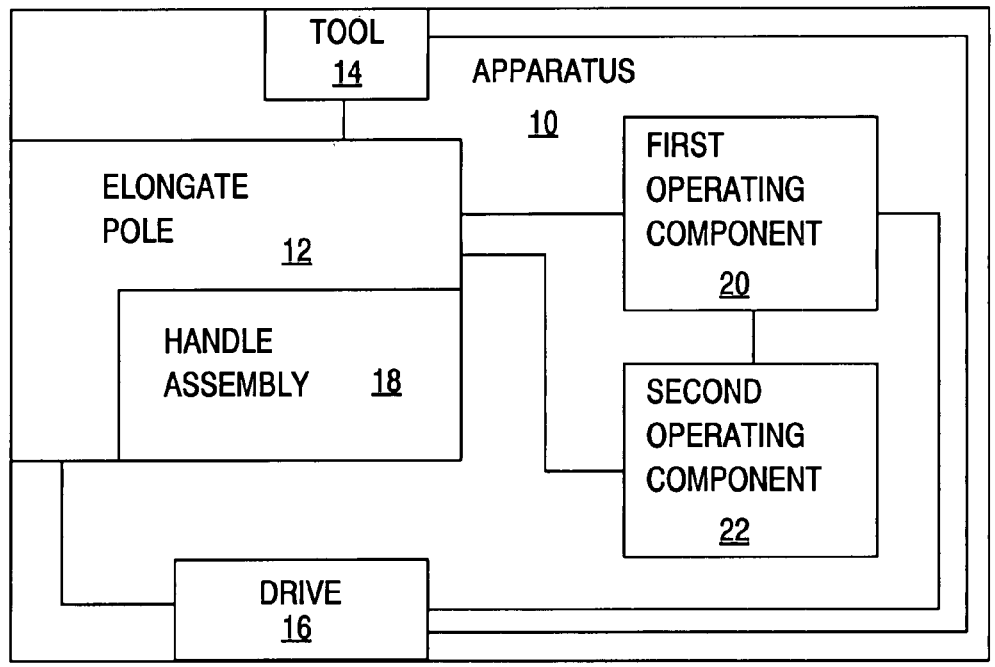
Fig. 1
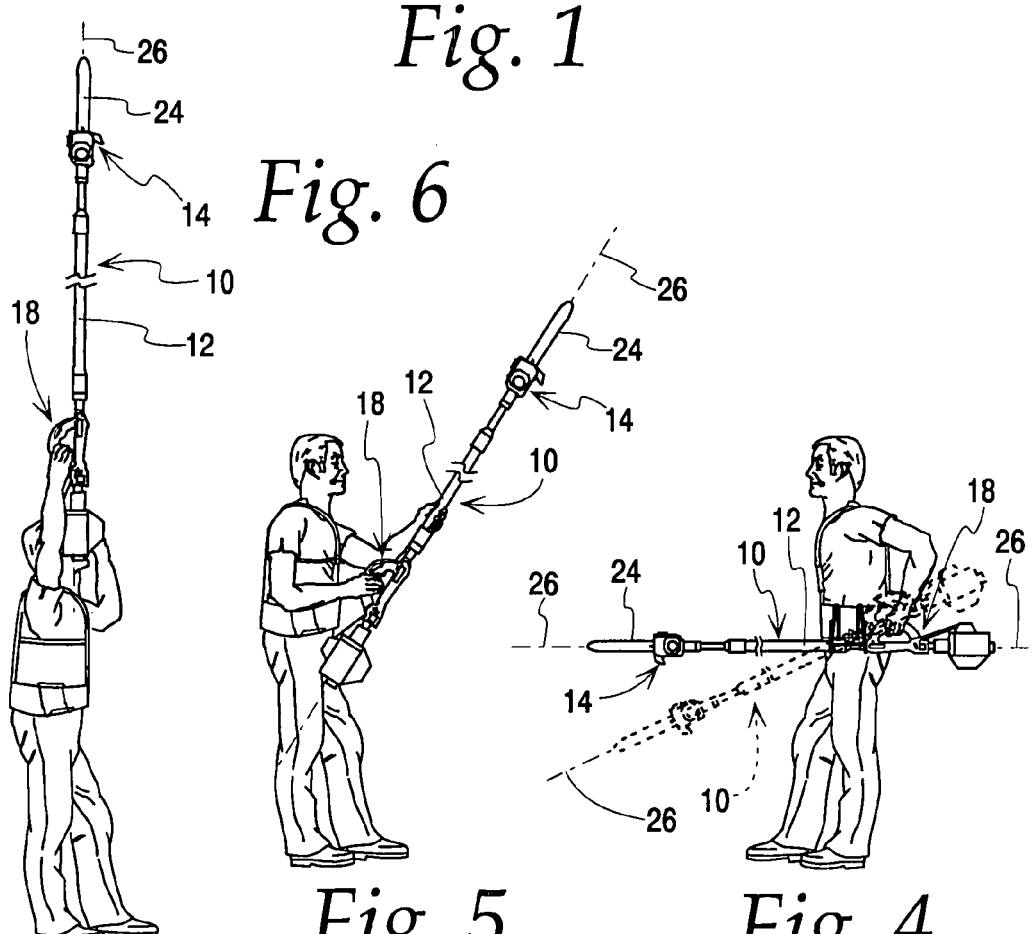
Fig. 6
Fig. 5
Fig. 4

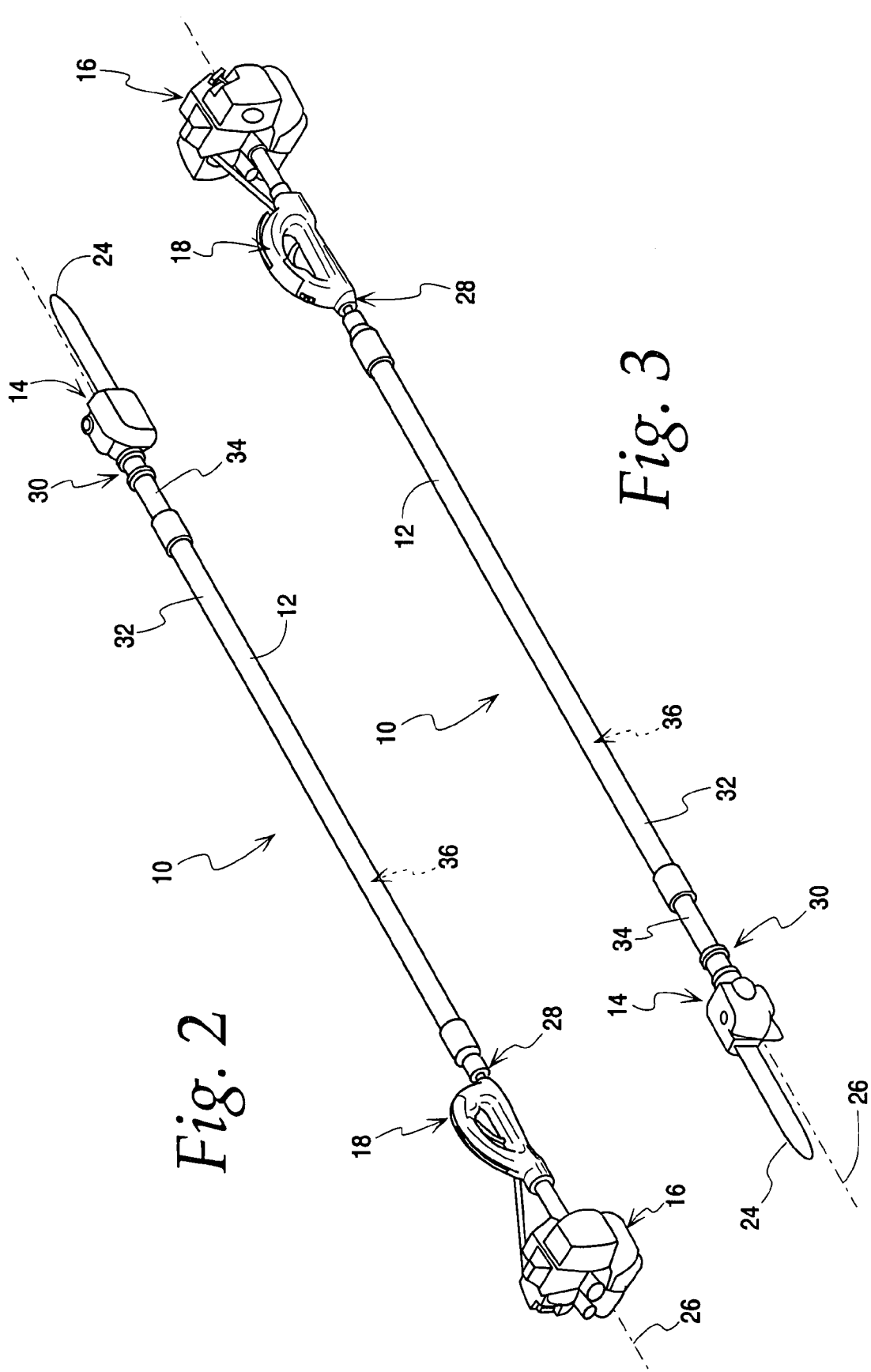

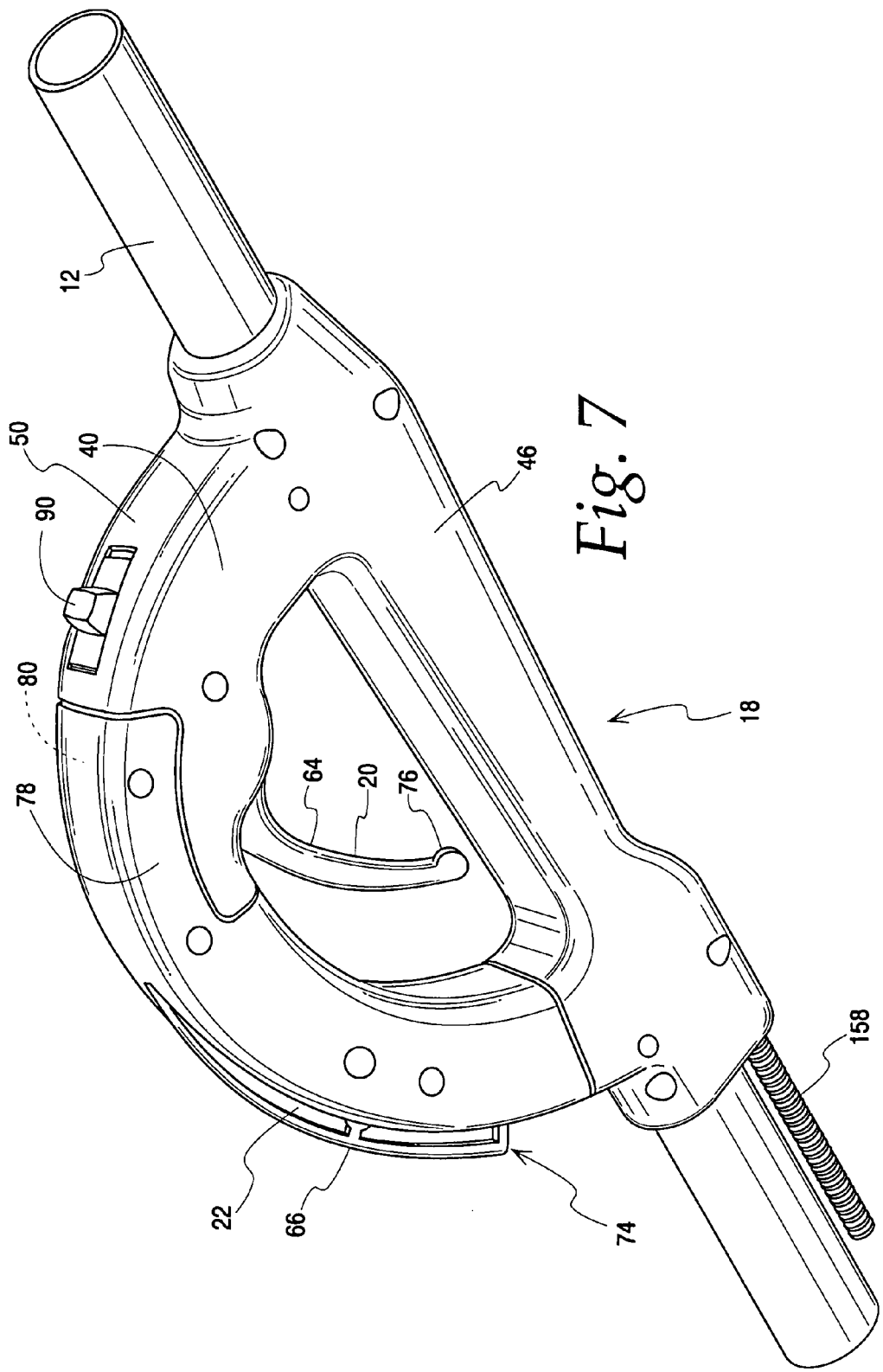

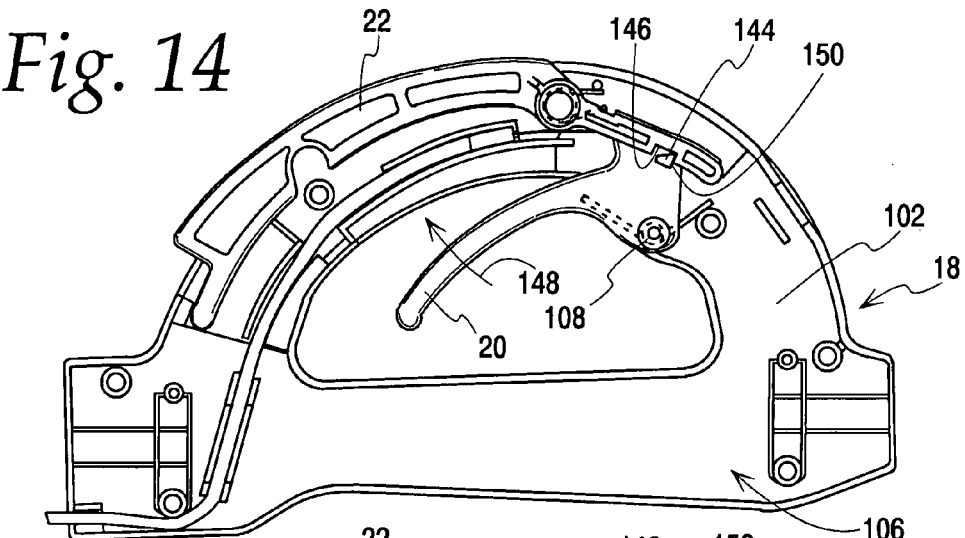
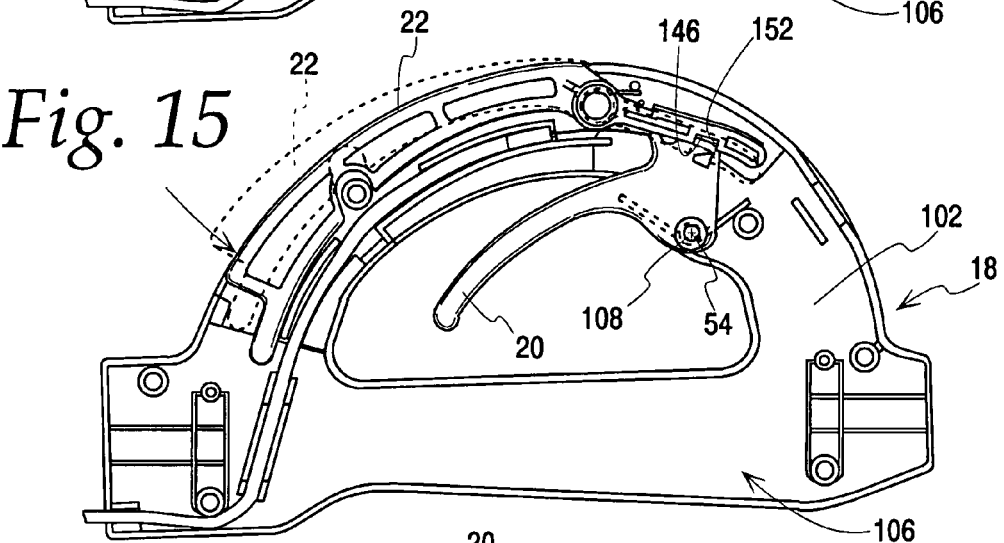
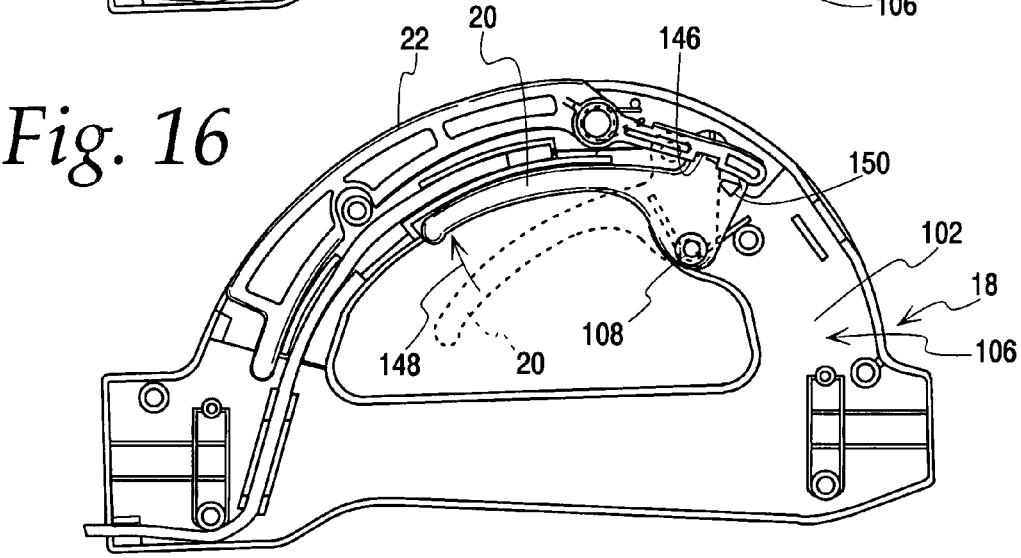

APPARATUS HAVING A TOOL ON AN ELONGATE POLE

BACKGROUND OF THE INVENTION

Field of the Invention

This invention relates to apparatus having an elongate pole with a tool mounted at a distal region of the elongate pole and, more particularly, to an apparatus for repositioning and operating the tool from a proximal region of the elongate pole.

Background Art

A multitude of different apparatus are currently in existence that utilize a tool mounted on an elongate pole that can be manipulated to facilitate placement of the tool at a desired location that is spaced from a region of the elongate pole that is held by a user. As one example, brush-type trimmers are commonly mounted at the distal region of an elongate pole, that may have a fixed or a variable length. At the proximal region of the pole, provision is made to conveniently grasp the apparatus in a manner that facilitates controlled user placement of the distal region at which the tool is located. Most commonly, this type of apparatus is utilized to permit the user to situate the tool at locations above those which are within the user's normal reach. As examples, the tool might employ an endless chain-type cutter, reciprocating trimmer blades, etc., which the user repositions to cut high limbs, or the like.

While manual-type tools are commonly used with this type of apparatus configuration, more recently a multitude of different powered tools have been devised for use on elongate poles. A drive for the tool is normally mounted at the proximal region adjacent to where the user controls the apparatus. The drive may be operated in any known manner, such as with an engine that operates on a combustible fuel, household current, a battery, etc. The drive transmits an operating force through a shaft that extends within the elongate pole.

The control mechanism for the drive typically consists of at least a throttle lever and an on/off switch that can be conveniently accessed by a user while gripping the apparatus at the proximal region for operation. In one form, with a straight grip construction, a user's hand extends graspingly around the lengthwise axis of the elongate pole. The throttle lever is pivotable about an axis that extends generally orthogonally to the central, lengthwise axis of the elongate pole. The throttle lever is situated to be movable by one of the user's fingers on the same hand that is grasping the apparatus at the proximal region of the elongate pole for operation.

In an alternative design, a "D"-shaped handle is provided with a curved portion that is spaced from the elongate pole and conveniently graspable by a user for operation. The throttle lever is commonly placed on the curved handle portion and is operated by the grasping hand in substantially the same manner as the earlier described embodiment.

To comply with industry regulations, and for purposes of safety, these powered apparatus are generally required to incorporate a safety switch that must be repositioned to allow the throttle lever to be moved in such a manner as to accelerate the drive. This avoids inadvertent movement of the throttle lever as might accelerate the drive.

Commonly, the safety switch is in the form of a lever that is pivoted or depressed. The safety switch is configured so that it is repositionable by a grasping hand of the user with the apparatus held thereby for normal operation. In one exemplary form, a user's one hand surrounds a grip portion with the palm region repositioning the safety switch. The user's fingers on the same hand are thus freed to operate the throttle lever.

One particular drawback with the straight grip or "D" handle grip configuration is that the user's reach with the tool is inherently somewhat limited. Additionally, use of an apparatus with this type of grip configuration may lead to considerable user fatigue.

With each of the straight grip and "D" handle grip configurations, the user is generally required to surround a region thereof that is generally parallel to the length of the pole axis. While holding and repositioning the apparatus in this manner, at some point as the user extends his/her operating arm upwardly, it becomes awkward or impossible to comfortably maintain a grip and simultaneously control the throttle lever and safety switch. Generally, this transition point occurs with the user's hand slightly above his/her head and the length of the arm angled slightly upwardly from horizontal.

Additionally, virtually the entire weight of the apparatus is borne by the user's hand in a manner that tends to hinge the wrist. Thus, a constant force must be exerted through the wrist to maintain the apparatus in the desired cutting position. After extended periods of operation, user fatigue may set in. This may lead to compromised work quality and, in a worst case, injuries.

The industry continues to seek out equipment designs that permit safe, controlled, and comfortable operation of a multitude of different tools and that may be mounted upon an elongate pole to provide the user with an extended reach.

SUMMARY OF THE INVENTION

In one form of the invention, a powered apparatus has an elongate pole with a length, a lengthwise central axis, and axially spaced proximal and distal regions. A tool is provided at the proximal region. A drive on the elongate pole operates the tool. A first operating component is repositionable between a first position and a second position to thereby change a state of the drive. A second operating component is repositionable between: a) a locked position, wherein the first operating component is prevented from being moved from the first position into the second position; and b) a released position, wherein the first operating component can be changed from the first position into the second position. A handle assembly can be operatively engaged by a user's one hand, wherein the user's one hand can: a) maintain the second operating component in the released position; and b) change the first operating component from the first position into the second position. The handle assembly has a gripping portion with an extent that can be grasped by the user's one hand at a plurality of different locations along the extent of the gripping portion, including at a first location in a manner wherein with the elongate pole vertically oriented, a majority of a vertical weight force component of the apparatus is directed generally parallel to the length of a user's forearm below the user's one hand, with the handle assembly operatively engaged by the user's one hand.

In one form, the gripping portion is U-shaped opening toward the central axis of the elongate pole.

In one form, the first operating component is pivotable around a first axis between the first position and the second position. The second operating component is pivotable around a second axis between the locked position and the released position. The first and second axes are substantially parallel to each other. The first and second operating components are simultaneously engageable and movable respectively between: a) the first position and the second position; and b) the locked position and the released position, by the user's one hand that is wrapped around the gripping portion.

In one form, the handle assembly defines a closed loop defined partially by the U-shaped gripping portion.

In one form, the U-shaped gripping portion has a first end and a second end spaced axially a first distance from the first end. The first end is closer to the distal region of the elongate pole than the second end. Curved inside and outside surfaces each extends between the first and second ends. The second operating component has a surface at the curved outside surface that is engageable by the palm region of the user's one hand with the palm region of the user's one hand engaging the curved outside surface adjacent to the second end of the U-shaped gripping portion.

In one form, the first operating component has a cantilevered lever with a free end that projects to a location wherein the free end can be engaged by the index finger on the user's one hand with the curved outside surface adjacent to the second end of the U-shaped gripping portion engaged by the palm region of the user's one hand.

In one form, the curved outside surface extends substantially fully to the second end of the U-shaped gripping portion.

In one form, the drive is mounted to the pole at a location wherein the handle assembly resides between the tool and the drive.

In one form, the first operating component is a speed control for the drive and causes a speed for the drive to change as the first operating component is changed between the first and second positions.

In one form, the tool has a cutting element for cutting vegetation.

In one form, the cutting element has a moving cutting chain.

In one form, the gripping portion is made from a first material and a second material is overmolded on the first material to facilitate grasping of the gripping portion.

In one form, the handle assembly is operatively engageable by a user's one hand on a user's one forearm with the user's one forearm in first and second different orientations. With the user's wrist substantially unbent, the length of the user's forearm is turned through approximately 90° between the first and second orientations.

In one form, the handle assembly is a self-contained unit that can be attached to and separated from the elongate pole.

In one form, a third operating component on the handle assembly is operable to change another state of the drive.

In one form, the third operating component is an on/off switch.

In one form, with the second operating component in the unlocked position, a surface on the second operating component is substantially flush with the curved outside surface.

In one form, the second operating component has a curved surface that conforms nominally to the curved outside surface.

In one form, the curved outside surface has a circumferential extent between the ends of the gripping portion and the curved surface on the second operating component extends over at least approximately one half the circumferential extent of the curved outside surface.

In one form, the first operating component is a cantilevered lever with a free end that extends to a location closer to the second end of the gripping portion than the first end of the gripping portion.

The invention is further directed to a method of operating a powered apparatus. The method includes the step of providing a powered apparatus having an elongate pole with a length, a lengthwise central axis, and axially spaced proximal and distal regions. A tool is provided at the proximal region. A drive on the elongate pole operates the tool. A first operating component is repositionable between a first position and a second position to thereby change a state of the drive. A second operating component is repositionable between: a) a locked position, wherein the first operating component is prevented from being moved from the first position into the second position; and b) a released position wherein the first operating component can be changed from the first position into the second position. A handle assembly can be operatively engaged by a user's one hand wherein the user's one hand can: a) maintain the second operating component in the released position; and b) change the first operating component from the first position into the second position. The method further includes the step of operatively engaging the handle assembly with a user's one hand associated with the one forearm of the user in first and second different manners, wherein the user's wrist on the user's one hand is not bent and the length of the user's one forearm makes an angle between where the one forearm resides while holding the handle assembly in the first and second different manners, that is at least 60°.

In one form, the angle is at least 90°.

In another form of the inventive method, a powered apparatus is provided having an elongate pole with a length, a lengthwise central axis, and axially spaced proximal and distal regions. A tool is provided at the proximal region. A drive on the elongate pole operates the tool. A first operating component is repositionable between a first position and a second position to thereby change a state of the drive. A second operating component is repositionable between: a) a locked position, wherein the first operating component is prevented from being moved from the first position with the second position; and b) a released position, wherein the first operating component can be changed from the first position into the second position. A handle assembly can be operatively engaged by a user's one hand wherein the user's one hand can: a) maintain the second operating component in the released position; and b) change the first operating component from the first position into the second position. The method further includes the step of operatively engaging the handle assembly in a manner wherein with the user's wrist on the user's one hand unbent, the length of the user's forearm associated with the user's one hand is generally parallel to the central axis of the elongate pole.

BRIEF DESCRIPTION OF THE DRAWINGS

FIG. 1 is a schematic representation of an apparatus, according to the present invention, including an elongate pole having a tool mounted thereon and a handle assembly for: a) holding and selectively repositioning the elongate pole; and b) operating the tool;

FIG. 2 is a perspective view of one specific form of apparatus, as depicted in FIG. 1;

FIG. 3 is a view of the apparatus in FIG. 2 from a different perspective;

FIG. 4 is a reduced, side elevation view of the apparatus in FIGS. 2 and 3 with the handle assembly operatively engaged by a user's one hand with a gripping portion thereon being held in a first manner to horizontally orient a length of the elongate pole;

FIG. 5 is a view as in FIG. 4 wherein the gripping portion is grasped in another manner to angularly orient the length of the elongate pole;

FIG. 6 is a view as in FIGS. 4 and 5 with the gripping portion grasped in still another manner to orient the length of the elongate pole vertically;

FIG. 7 is an enlarged, fragmentary, perspective view of the handle assembly region on the apparatus in FIGS. 2-6;

FIG. 14 is an enlarged, elevation view of part of the handle assembly with one of two joinable housing parts separated and showing a specific form of the first and second operating components of FIG. 1 and with the first operating component in its first position and the second operating component in its locked position;

FIG. 15 is a view as in FIG. 14 wherein the second operating component is moved into its unlocked position and the first operating component is in its first position; and FIG. 16 is a view as in FIG. 15 wherein the second operating component is in its unlocked position and the first operating component is moved from its first position, in FIGS. 14 and 15, into its second position.

DETAILED DESCRIPTION OF THE DRAWINGS

Figure 8:
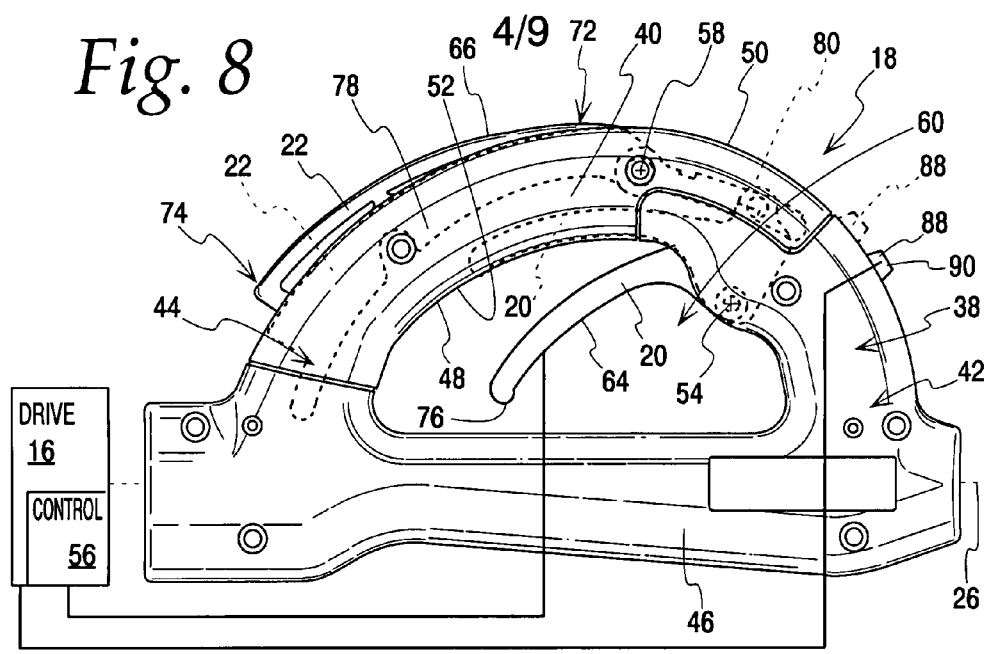
FIG. 8 is an enlarged, side elevation view of the handle assembly in FIG. 7.

The invention is directed to a powered apparatus, as shown schematically at 10 in FIG. 1. The apparatus 10 consists of an elongate pole 12 to which a tool 14 is operatively mounted. A drive 16 on the elongate pole 12 operates the tool 14. A handle assembly 18 on the elongate pole 12 facilitates controlled operation of the apparatus 10. A first operating component 20 is repositionable between a first position and a second position to thereby change a state of the drive 16. A second operating component 22 is repositionable between: a) a locked position, wherein the first operating component 20 is prevented from being moved from the first position into the second position; and b) a released position wherein the first operating component 20 can be changed from the first position into the second position.

The apparatus 10 is shown in schematic form because the components thereof can take a multitude of different forms without departing from the invention. For example, the tool 14 can be any powered tool that is required to be controllably positioned to perform an operation on an object. As examples, the tool 14 could be a brush cutter, such as one with a moving cutting chain, reciprocating blades, etc. The tool 14 is not limited to one that performs operations on brush, such as to cut limbs, shape vegetation, etc.

The elongate pole 12 may be made with a fixed length along a central, lengthwise axis, or have a variable length. As one example, the elongate pole 12 might have telescoping sections that allow length adjustment, as determined by the needs of a user during a particular job.

The drive 16 may be any type used in a variety of different industries. For example, the drive 16 may have a fuel burning engine, may be operated through household current, a battery, etc. Any known mechanism that operates the tool 14 could be used for the drive 16.

The first operating component 20 may change any of a number of states for the drive 16. As one example, the first operating component may change the speed of the drive 16.

The second operating component 22 may be any type of locking mechanism that cooperates directly or indirectly with the first operating component 20 to selectively block and permit movement thereof from its first position into its second position.

The primary focus of the present invention is upon the handle assembly 18, which is shown in one representative environment in FIGS. 2-16; that being in association with an apparatus 10 with a tool 14 having an endless, moving, cutting chain 24.

In this configuration, the elongate pole 12 has a length with a lengthwise central axis 26. The elongate pole 12 has axially spaced proximal and distal regions 28, 30, respectively. The tool 14 is mounted to the elongate pole 12 at the distal region 30. While the drive 16 could be incorporated elsewhere, it is shown on the apparatus 10 at the proximal region 28.

In this embodiment, the elongate pole 12 is made with telescoping sections 32, 34, with the understanding that any number of such sections are contemplated, as is a fixed length elongate pole.

The details of the mechanism for transmitting a force from the drive 16 to the tool 14 are not critical to the present invention. It suffices to say that with a suitable force transmission assembly 36, generally but not necessarily at least partially within the elongate pole 12, power from the drive 16 is transmitted therethrough to cause movement of the cutting chain 24 with a variable speed, as dictated by the state of the drive 16. In this embodiment, the drive incorporates a combustible fuel operated engine.

In this embodiment, the handle assembly 18 performs multiple functions. First of all, it provides a structure that can be conveniently grasped by a user to reposition the apparatus 10. More specifically, by grasping the handle assembly 18 at the proximal region 28, the elongate pole 12 can be repositioned so that the tool 14 can be controllably placed at a desired location to perform a cutting operation thereat. The handle assembly 18 is configured to allow the user to grasp the handle assembly 18 in different manners to thereby facilitate placement, and comfortable holding, of the apparatus 10 in different orientations, as shown in FIGS. 4-6, and respectively corresponding FIGS. 9-11.

Figure 9:
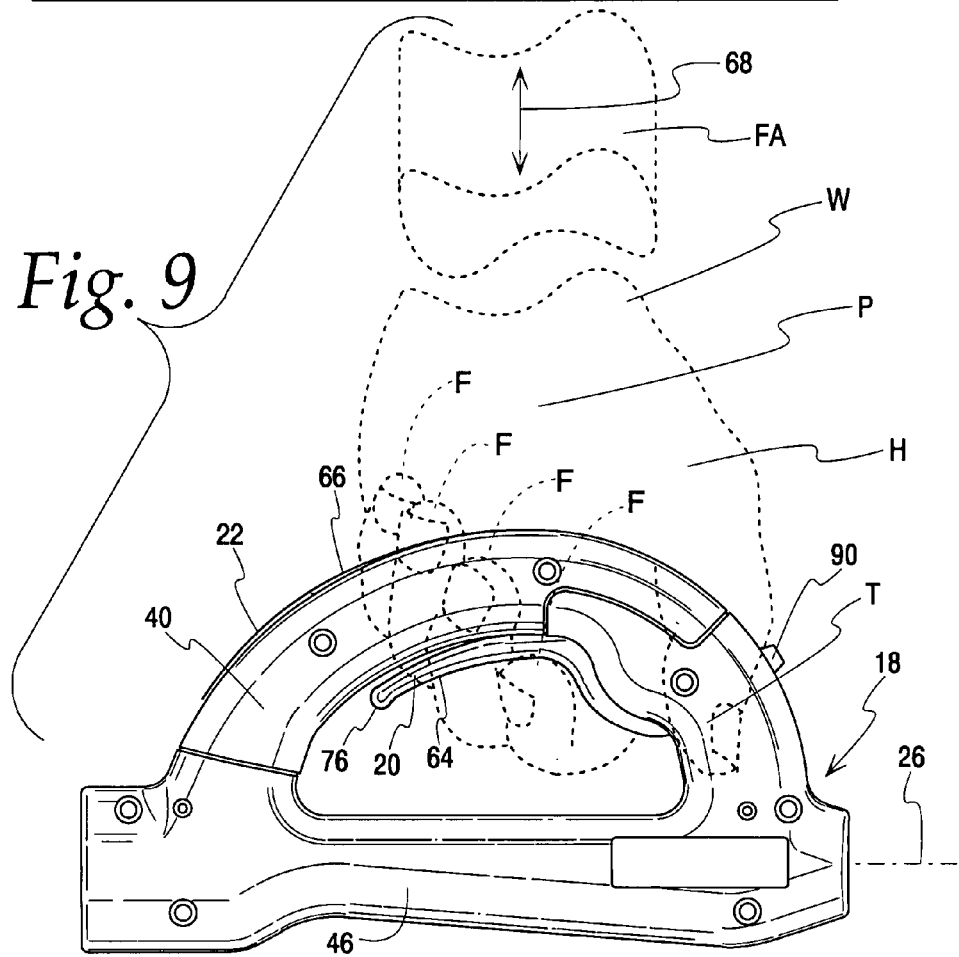
FIG. 9 is a view as in FIG. 8 wherein a user's hand is operatively engaging the handle assembly in a manner corresponding to that in FIG. 4.
Figure 10:
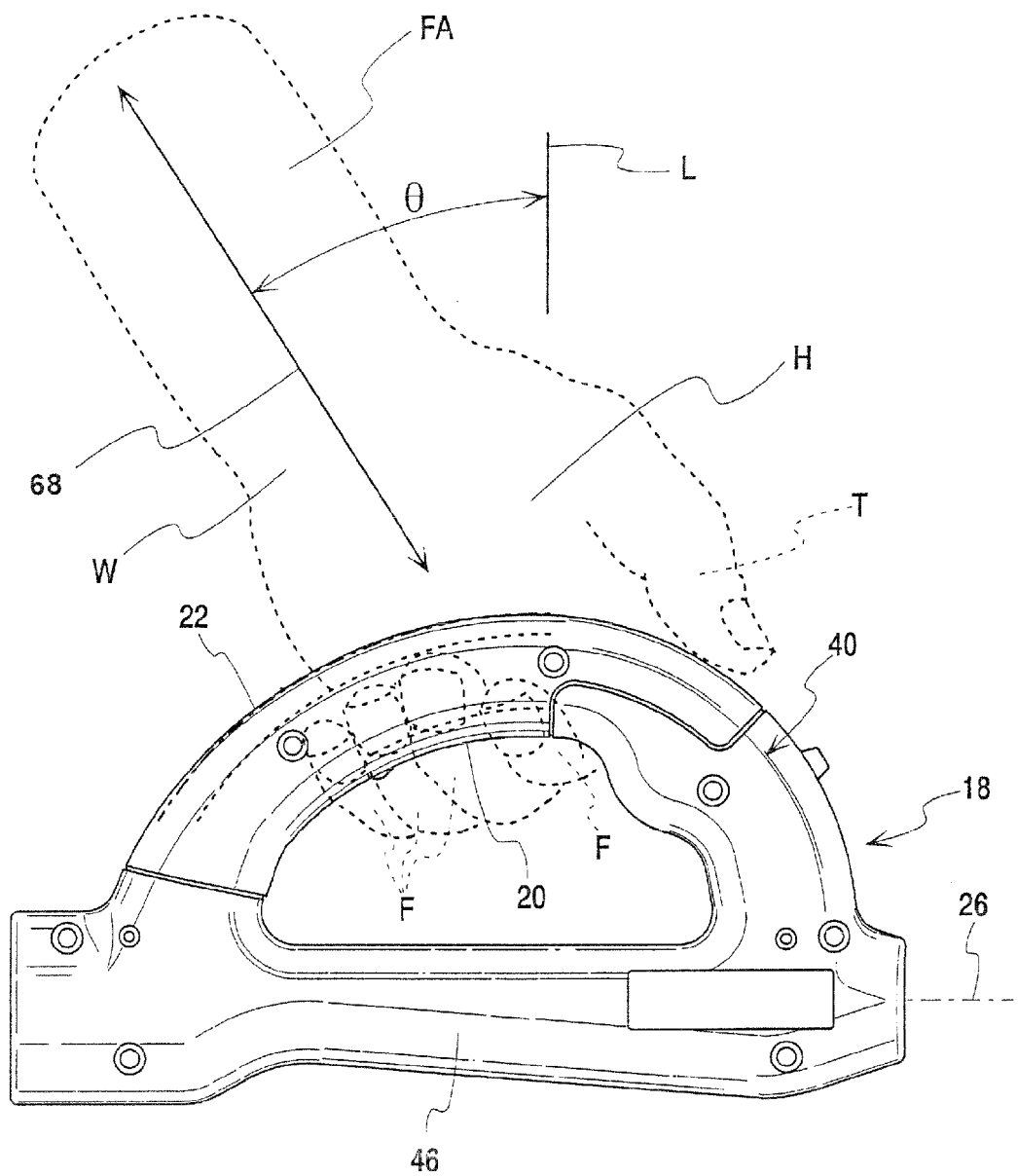
FIG. 10 is a view as in FIG. 8 wherein the user's hand is operatively engaging the handle assembly in a manner corresponding to that in FIG. 5.
Figure 11:
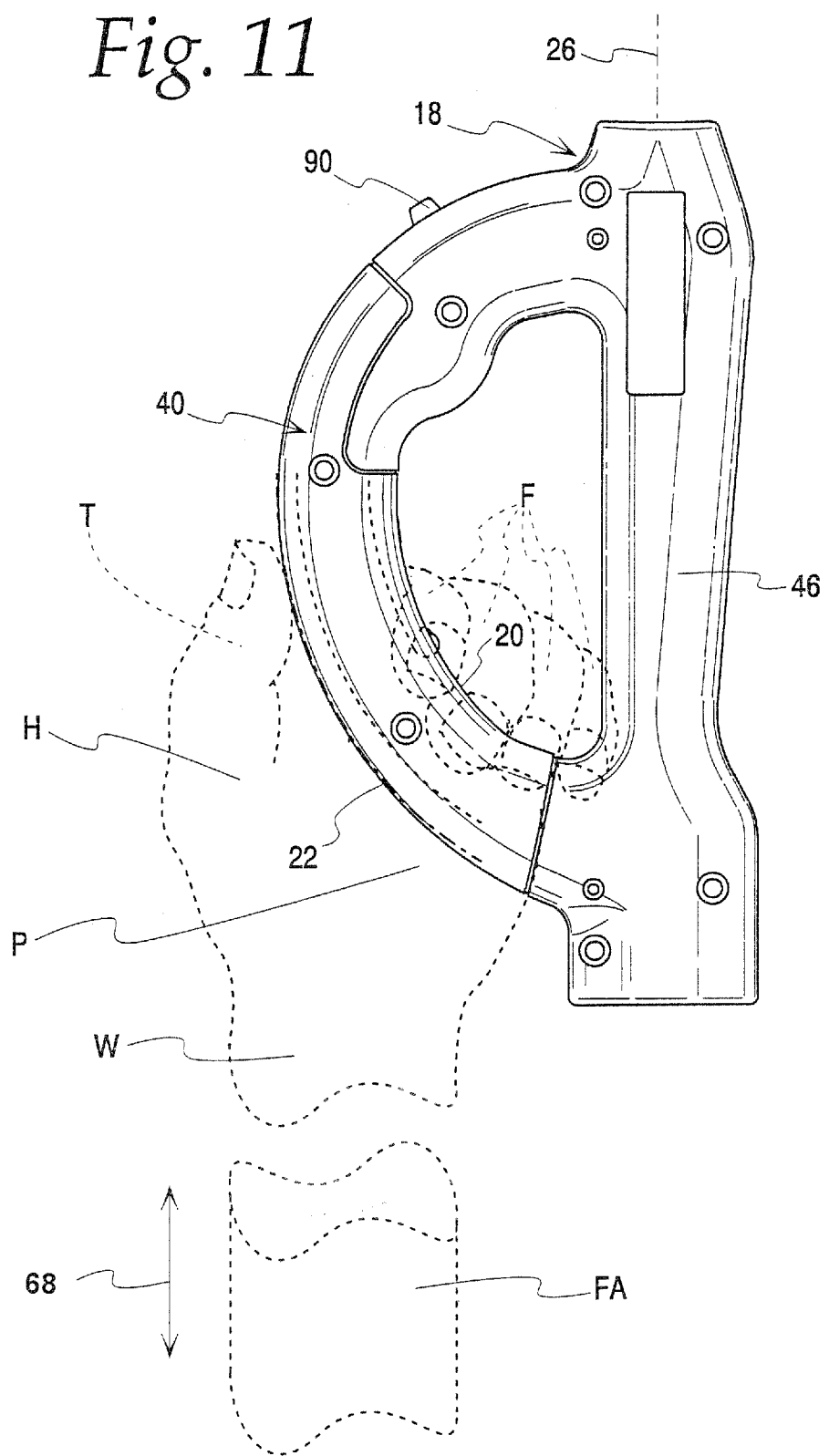
FIG. 11 is a view as in FIG. 8 wherein the user's hand is operatively engaging the handle assembly in a manner corresponding to that in FIG. 6.
Figure 12:
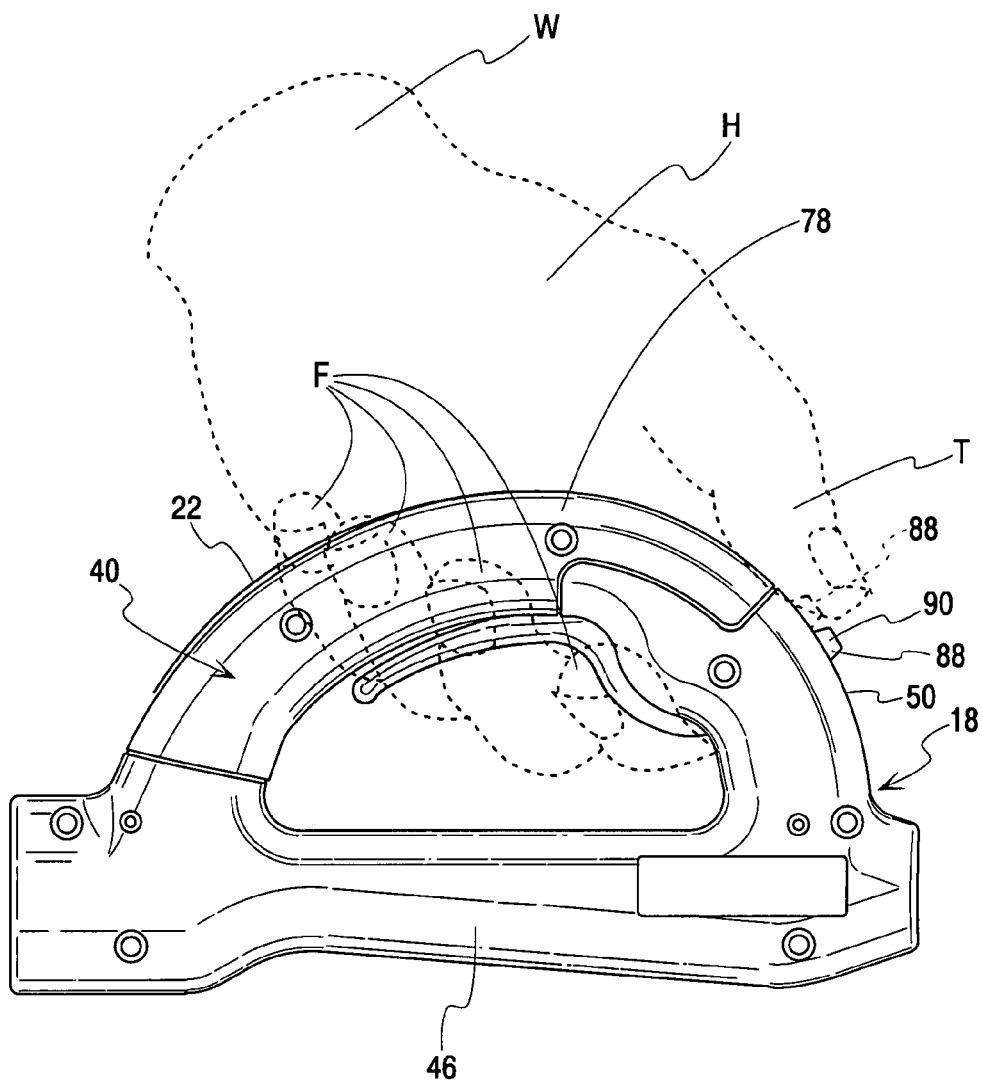
FIG. 12 is a view as in FIG. 10 wherein the user's hand is repositioned to operate an on/off switch.

In FIGS. 6 and 11, the apparatus 10 is shown with the central axis 26 of the elongate pole 12 substantially vertically oriented. In FIGS. 4 and 9, the apparatus 10 is shown with the central axis 26 substantially horizontally oriented in solid lines and slightly declined in dotted lines. In FIGS. 5 and 10, the central axis 26 is shown angularly between the horizontal and vertical positions shown in FIGS. 4 and 6.

As seen in greater detail primarily in FIGS. 7-16, the handle assembly 18 has a body 38 that is "D"-shaped to define a closed loop. The body 38 consists of a U-shaped gripping portion 40, with the "U" opening in a direction that is generally orthogonal the central axis 26 of the elongate pole 12. The U-shaped gripping portion 40 has a first end 42 and second end 44 joined to a straight section 46 that extends generally parallel to the axis 26.in substantially concentric relationship therewith. The first and second ends 42, 44 are spaced axially a first distance, with the first end 42 closer to the distal region 30 than the second end 44. The first and second ends 42, 44 terminate adjacent to the central axis 26, as seen in FIG. 10. The straight section 46 bridges the first and second ends 42, 44.

The gripping portion 40 has curved inside and outside surfaces 48, 50, respectively, each extending between the first and second ends 42, 44. As seen clearly in FIGS. 9-12, the user is allowed to extend his/her fingers F into an opening 52 bounded by the gripping portion 40 in a manner that the fingers can be wrapped in one direction around the gripping portion 40, with the user's thumb T wrapped oppositely, as more particularly hereinafter described.

The first operating component 20 is in the form of a cantilevered lever that is pivotable relative to the gripping portion 40 around an axis 54 between a first position, as shown in solid lines at FIG. 8, and a second position, as shown in dotted lines in that same Figure. The axis 54 is substantially orthogonal to the axis 26. As explained in greater detail below, movement of the first operating component 20 from the first position into the second position operates a control 56 associated with the drive 16, to thereby change a state of the drive 16. In the embodiment shown, the control 56 is a throttle control, as associated with a carburetor. By changing the first operating component 20 from the first position towards and into the second position, the control 56 causes the drive 16 to operate at higher speeds.

The second operating component 22 is also in the form of a lever that is pivotable about an axis 58, that is spaced from and parallel to the axis 54. The second operating component is movable between a released position, as shown in dotted lines in FIG. 8, and a locked position, as shown in solid lines in that same Figure.

It suffices to preliminarily note that the second operating component 22, in the locked position therefor, blocks movement of the first operating component 20 from its first position into its second position. Consequently, to reposition the first operating component 20, the second operating component 22 must be changed from its locked position into its released position, whereupon the first operating component 20 can be pivoted from its first position into its second position. This action is facilitated by the depicted location of the two components 20, 22. As shown, a user can extend his/her fingers F into the region of the opening 52 identified at 60, whereupon oppositely facing surfaces 64, 66, respectively on the first and second operating components 20, 22, can be respectively engaged by the user's fingers and palm region P and moved together under a squeezing action by the user's one hand H from their solid line positions into their dotted line positions. The resistance to this movement is greater for the first operating component 20 than the second operating component 22. Consequently, under this squeezing action, the second operating component 22 will first readily move to its released position, thereby allowing the first operating component to be moved from its first position into its second position.

With the configuration shown, the handle assembly 18 can be operatively engaged by a user's one hand H in different manners, in each of which: a) the palm P on the user's one hand maintains the second operating component 22 in the released position; and b) the fingers F on the user's one hand are situated to be moved to change the first operating component 20 from the first position towards and into the second position therefor. Certain exemplary manners for operatively engaging the handle assembly 18 will now be described.

As shown in FIG. 9, the handle assembly 18 is operatively engaged by a user's one hand H in a manner with the wrist W substantially unbent so that the length of the users forearm FA, indicated by the double-headed arrow 68, is substantially orthogonal to the central axis 26. This allows the user to maintain the apparatus 10 with the central axis 26 of the elongate pole 12 substantially horizontally oriented, corresponding to the position shown in solid lines in FIG. 4.

Alternatively, as shown in FIG. 11, the user can nest the handle assembly 18 in the palm P of the user's one hand H. In FIG. 11, the length of the user's forearm, as indicated by the double-headed arrow 68, with the wrist unbent, is substantially parallel to the central axis 26. With the gripping portion 40 grasped by the user's hand in a manner and at a location shown in FIG. 11, and the elongate pole 12 vertically oriented as shown also in FIG. 6, a majority, and substantially the entirety, of the vertical weight force component for the apparatus 10 is directed generally parallel to the length of the users forearm FA below the user's one hand H. Accordingly, the lifting force is comfortably transmitted through the hand H and wrist W and to the forearm FA so as not to put any appreciable bending force upon the user's wrist that would tend to lead to fatigue after extended use. At the same time, the operative engagement of the handle assembly 18 in the manner shown in FIGS. 6 and 11 allows the user to extend his/her arm fully over his/her head to maximize the reach of the apparatus 10, as shown in FIG. 6.

The handle assembly can be operatively engaged by user's one hand at a further alternative location between the locations shown in FIGS. 9 and 11, as depicted in FIG. 10. In FIG. 10, the handle assembly 18 is operatively engaged by the user's one hand H with the wrist W substantially unbent and the length of the forearm FA, indicated by the double-headed arrow 68, making an angle $\theta$ with a line L that is substantially orthogonal to the central axis 26 of the elongate pole 12. This grip is effected to situate the apparatus 10 as shown in FIG. 5.

The geometry of the handle assembly 18 makes possible the grasping of the gripping portion 40 at selected locations along the extent of the gripping portion, in different manners as shown with the length of the user's forearm FA moved through a range of angles of at least 60°, and more preferably 90°, as shown in FIGS. 9-11, and potentially therebeyond.

The ability to operatively engage the handle assembly 18 in the different manners is made possible in part by extending the surface 66 of the second operating component 22 over a substantial circumferential portion of the outside surface 50 of the gripping portion 40, whereby the surface 66 is accessible to be comfortably engaged by the user's palm region through the full range of forearm angles shown. Pressure application upon the second operating component 22, by squeezing the gripping portion 40 virtually anywhere over the entire exposed extent of the surface 66, will cause the second operating component 22 to change from its locked position into its released position. In this embodiment, the surface 66, which nominally conforms to the shape of the outside surface 50 of the gripping portion 40 over approximately one half or more of its lengthwise extent, is exposed from a midpoint location on the outside surface 50 identified at 72, approximately midway between the ends 42, 44, to a second location on the outside surface 50 identified at 74 that is at the end 44, or alternatively closely adjacent thereto such as is shown in FIG. 8, wherein the surface 66 projects over a majority of a lengthwise extent of the outside surface 50 between the midpoint location 72 and the second end 44.

With the handle assembly 18 operatively grasped/engaged by a user's hand H through the range between FIGS. 9 and 11, the user's fingers are at all times conveniently situated at the surface 64 to allow pivoting thereof as an incident of the fingers being moved towards the palm in a gripping action. The first operating component 20 projects in cantilever fashion so that a free end 76 thereof is located to be conveniently engaged by at least the user's index finger with the handle assembly operatively engaged as shown in FIG. 11.

In summary, in normal operation with the user's wrist straight/unbent, the handle assembly 18 will be operatively engageable by a user's one hand with the hand and forearm in first and second orientations, shown in FIGS. 9 and 11, and orientations therebetween. Between the FIG. 9 and FIG. 11 orientations the length of the user's forearm is turned through approximately 90°. As noted above, this angle can be extended beyond 90° with the depicted structure.

For purposes of comfort and predictable control, with the first operating component 20 in its second position, the surface 64 thereon is substantially flush with the surface 48 on the gripping portion 40. This represents the maximum throttle position at which the drive 16 may be operated. Intermediate operating throttle settings are set with the first operating component 20 between its first and second positions. Similarly, for purposes of comfort and predictable operation, with the second operating component 22 in its released position, the circumferential surface 66 thereon becomes substantially flush with the outside surface 50 of the gripping portion 40.

Further comfort can be afforded by providing an overmolded portion 78 made from a first material that is softer than a material on an underlying portion 80 on the gripping portion 40. The overmolded portion may be strategically placed to cover substantially the entire area of the gripping portion 40 that will be engaged by the user's hand in operation.

In the embodiment shown, a third operating component 88 is provided and has an exposed portion 90 at the outside surface 50. With the handle assembly 18 grasped as in FIG. 12, the user's thumb T can be extended and thereafter drawn back to engage the exposed part 90 on the operating component 88 and move the same in a manner that the operating component 88 is shifted circumferentially between the solid line position and dotted line position shown in the FIGS. 8 and 12. As an incident of this movement, the operating component 88 causes another state of the drive 16 to change. For example, the operating component 88 may be an on/off switch.

With the handle assembly 18 shown, the design is "no-handed". That is, it can be similarly held by, and operated through, either hand of a user.

While not necessary, a description of the details of the components of the handle assembly 18, and their interaction with the elongate pole 12 and drive 16, will now be made with respect to FIGS. 13-16. The handle assembly 18 consists of joinable housing parts 100, 102, each D-shaped and substantially a mirror image of the other. The housing parts 100, 102 are releasably joinable through threaded fasteners 104 to captively engage the elongate pole 12 and cooperatively define a component compartment 106. The housing parts 100, 102 and components in the compartment 106 define a self-contained unit that can be attached operatively to the elongate pole 12.

The housing part 102 has a projecting post 108 that extends through a bore 110 in the first operating component 20 to guide pivoting movement thereof about the axis 54. The first operating component 20 cooperates with a throttle cable 112. The throttle cable 112 has an outer sleeve 114 that slidably receives an inner core 116 with an end fitting 118. The end fitting 118 fits in a receptacle 120 on the first operating component 20 that is offset from the axis 54. Pivoting movement of the first operating component 20 from its first position into its second position causes the inner core 116 to be drawn out of the sleeve 114, whereupon a spaced end 122 of the inner core 116 is repositioned to operate the control 56, as hereinabove described. That is, through the control 56, the speed of the drive 16 can be controlled through a range, corresponding to the first and second positions of the first operating component 20.

A torsion coil spring 124 surrounds the post 108 and has legs 126, 128 projecting away from the axis 54 and loaded respectively against the first operating component 20 and a post 130 on the housing part 102 to normally bias the first operating component 20 towards its first position.

The second operating component 22 is mounted for pivoting movement upon a post 132 projecting from the housing part 102. The post 132 guides pivoting movement of the second operating component 22 about the axis 58, that is parallel to the axis 54. Through a separate torsion coil spring 134, the second operating component 22 is normally biased towards its locked position. The spring 134 is loaded by bearing separate legs 136, 138 respectively against a post 140 on the housing part 102 and an undercut surface 142 on the second operating component 22.

As noted above, the spring 134 is constructed and/or loaded in a manner that it exerts a lesser force upon the second operating component 22 than does the spring 124 on the first operating component 20. Through this arrangement, the user's captive gripping action upon the surfaces 64, 66 on the first and second operating components 20, 22, respectively, will cause the second operating component 22 to move initially towards the release position whereupon the first operating component 20 thereafter can be repositioned from its first position towards its second position.

The first operating component 20 has a projecting boss 144 that nests in a receptacle 146 on the second operating component 22 with the second operating component in the locked position of FIG. 14. In this state, if a pivoting force in the direction of the arrow 148 is applied to the first operating component 20, a surface 150 on the boss 144 abuts to a surface 152 on the second operating component 22 bounding the receptacle 146, thereby causing the first operating component 20 to be blocked against movement. By pivoting the second operating component 22 into the released position of FIGS. 15 and 16, the boss 144 moves out of the receptacle 146, whereby the surfaces 150, 152 do not interfere with each other as the first operating component 20 is changed from its first position of FIG. 14 into its second position shown in FIG. 16.

Figure 13:
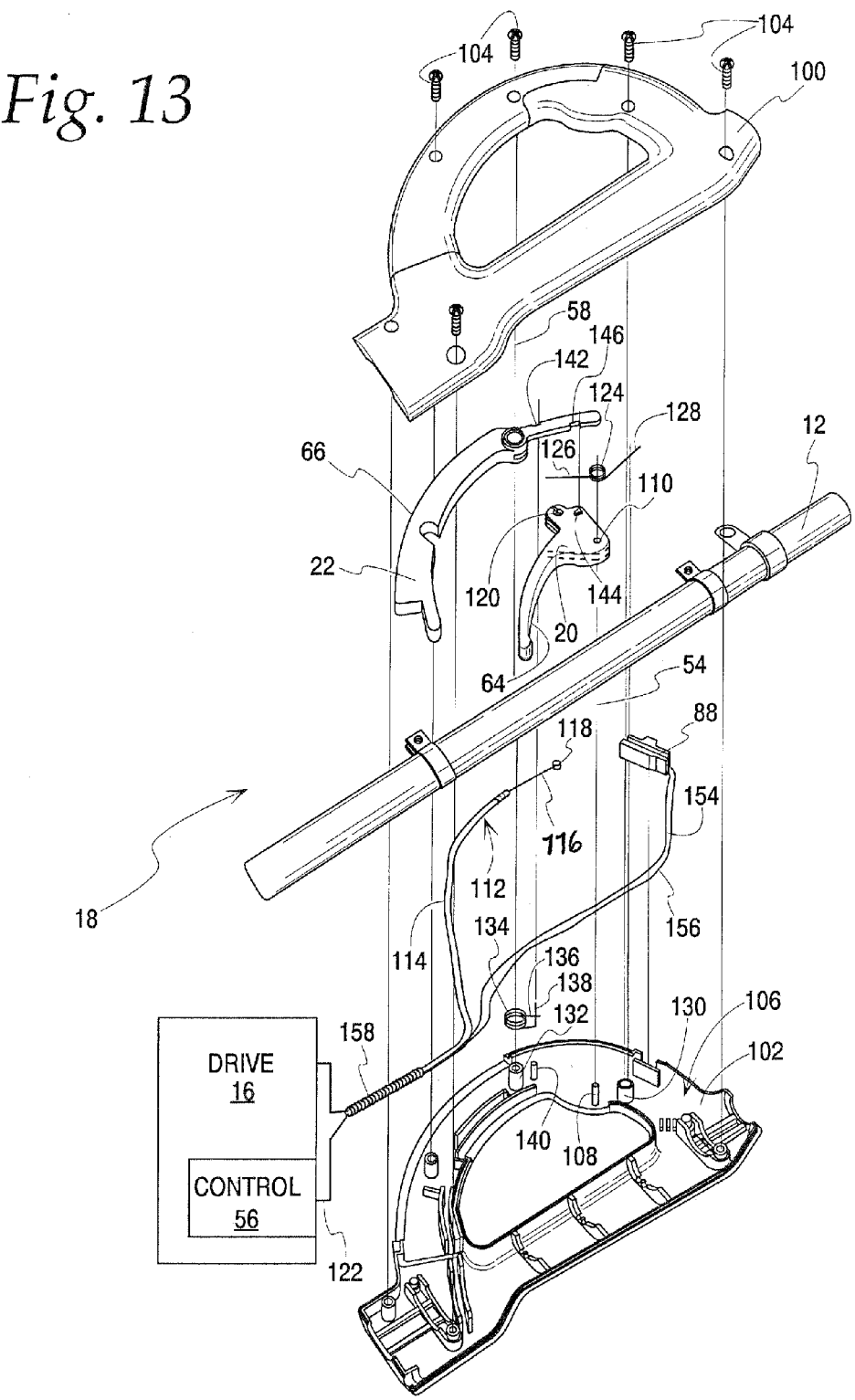
FIG. 13 is an exploded, perspective view of the handle assembly in FIGS. 7-12.

As seen in FIG. 13, the operating component 88 is electrically connected to the drive 16 through separate wires 154, 156 for conventional operation. That is, by repositioning the operating component 88, the drive 16 is selectively turned "on" and "off".

A sheath 158 is provided to contain the throttle cable 112 and wires 154, 156 for wire management purposes.

The foregoing disclosure of specific embodiments is intended to be illustrative of the broad concepts comprehended by the invention.

The invention claimed is:
1. A powered apparatus comprising:
an elongate pole having a length, a lengthwise central axis, and axially spaced proximal and distal regions;
a tool at the distal region;
a drive on the elongate pole for operating the tool;

a first operating component that is operatively connected to the drive and is repositionable between a first position and a second position to thereby change a state of the drive;

a second operating component that is repositionable between: a) a locked position wherein the first operating component is prevented from being moved from the first position into the second position; and b) a released position wherein the first operating component can be changed from the first position into the second position; and a handle assembly that can be operatively engaged by a user's one hand wherein the user's one hand can: a) maintain the second operating component in the released position; and b) change the first operating component from the first position into the second position, the handle assembly disposed at the proximal region and comprising a gripping portion with an extent that can be grasped by the user's one hand at a plurality of different locations along the extent of the gripping portion including at a first location in a manner wherein with the elongate pole vertically oriented a majority of a vertical weight force component of the apparatus is directed generally parallel to the length of a user's forearm below the user's one hand, with the handle assembly operatively engaged by the user's one hand, wherein the gripping portion is U-shaped, the U-shaped gripping portion formed by a base and first and second legs and opening in a direction that is generally orthogonal to the central axis of the elongate pole, wherein the U-shaped gripping portion has a first end and a second end spaced axially from each other a first distance with the first end closer to the distal region of the elongate pole than the second end, the U-shaped gripping portion including curved inside and outside surfaces each generally U-shaped and extending between the first and second ends of the gripping portion, the gripping portion configured so that a user can hold the gripping portion selectively in: a) a first manner wherein a user's one hand is wrapped around the base on the gripping portion with a plurality of fingers on the user's one hand wrapped around a first line that is generally parallel to the lengthwise central axis and towards a palm on the user's one hand; and b) a second manner wherein a user's hand is wrapped around the first leg on the gripping portion with a plurality of fingers on the user's one hand wrapped around a second line that is at a substantial angle to the first line and towards the palm on the user's one hand, wherein the second operating component has a surface adjacent the curved outside surface that, with the second operating component in the locked position, projects from the curved outside surface from a midpoint location approximately midway between the first and second ends of the gripping portion towards the second end of the gripping portion over a majority of a lengthwise extent of the curved outside surface between the midpoint location and the second end of the gripping portion so that the surface on the second operating component can be engaged and pressed by the palm on the user's one hand to thereby change the second operating component into the released position with the gripping portion held in each of the first and second manners, the first operating component engageable by at least a first finger on the user's one hand with the gripping portion held in each of the first and second manners and repositionable by the at least first finger to be changed into the second position.

2. The powered apparatus according to claim 1 wherein the first operating component is pivotable around a first axis between the first position and the second position, the second operating component is pivotable around a second axis between the locked position and the released position, the first and second axes are substantially parallel to each other, and the first and second operating components are simultaneously engageable and movable respectively between: a) the first position and the second position; and b) the locked position and the released position by the user's one hand that is wrapped around the gripping portion.

3. The powered apparatus according to claim 2 wherein the handle assembly defines a closed loop defined partially by the U-shaped gripping portion.

4. The powered apparatus according to claim 2 wherein the first operating component comprises a cantilevered lever with a free end that projects to a location wherein the free end can be engaged by the index finger on the user's one hand with the curved outside surface adjacent to the second end of the U-shaped gripping portion engaged by the palm region of the user's one hand.

5. The powered apparatus according to claim 2 further comprising a third operating component on the handle assembly that is operable to change another state of the drive.

6. The powered apparatus according to claim 5 wherein the third operating component is an on/off switch.

7. The powered apparatus according to claim 1 wherein the curved outside surface extends substantially fully to the second end of the U-shaped gripping portion.

8. The powered apparatus according to claim 1 wherein the drive is mounted to the pole at a location wherein the handle assembly resides between the tool and the drive.

9. The powered apparatus according to claim 1 wherein the first operating component comprises a speed control for the drive and causes a speed for the drive to change as the first operating component is changed between the first and second positions.

10. The powered apparatus according to claim 1 wherein the tool comprises a cutting element for vegetation.

11. The powered apparatus according to claim 10 wherein the cutting element comprises a moving cutting chain.

12. The powered apparatus according to claim 1 wherein the gripping portion is made from a first material and a second material is overmolded on the first material to facilitate grasping of the gripping portion.

13. The powered apparatus according to claim 1 wherein the handle assembly is operatively engageable by a user's one hand on a user's one forearm with the user's one forearm in first and second different orientations wherein with the user's wrist substantially unbent, the length of the user's forearm is turned through approximately 90° between the first and second orientations.

14. The powered apparatus according to claim 1 wherein the handle assembly comprises a self-contained unit that can be attached to and separated from the elongate pole.

15. The powered apparatus according to claim 1 wherein with the second operating component in the unlocked position, the surface on the second operating component is substantially flush with the curved outside surface.

16. The powered apparatus according to claim 1 wherein the surface on the second operating component is curved and conforms nominally to the curved outside surface.

17. The powered apparatus according to claim 16 wherein the curved outside surface of the gripping portion has a circumferential extent between the ends of the gripping portion and the curved surface on the second operating component extends continuously over at least approximately one half the circumferential extent of the outside surface of the gripping portion.

18. The powered apparatus according to claim 1 wherein the first operating component comprises a cantilevered lever with a free end that extends to a location closer to the second end of the gripping portion than the first end of the gripping portion.

19. The powered apparatus according to claim 1 wherein the first and second ends of the U-shaped gripping portion terminate adjacent to the central axis of the elongate pole.

20. The powered apparatus according to claim 19 wherein the handle assembly comprises a straight section that is substantially concentric with the central axis of the elongate pole and bridges the first and second ends of the U-shaped gripping portion.

21. A powered apparatus comprising:
an elongate pole having a length, a lengthwise central axis, and axially spaced proximal and distal regions;
a tool at the distal region;
a drive on the elongate pole for operating the tool;
a first operating component that is operatively connected to the drive and is repositionable between a first position and a second position to thereby change a state of the drive;
a second operating component that is repositionable between: a) a locked position wherein the first operating component is prevented from being moved from the first position into the second position; and b) a released position wherein the first operating component can be changed from the first position into the second position; and
a handle assembly that can be operatively engaged by a user's one hand wherein the user's one hand can: a) maintain the second operating component in the released position; and b) change the first operating component from the first position into the second position,
the handle assembly disposed at the proximal region and comprising a gripping portion with an extent that can be grasped by the user's one hand at a plurality of different locations along the extent of the gripping portion including at a first location in a manner wherein with the elongate pole vertically oriented a majority of a vertical weight force component of the apparatus is directed generally parallel to the length of a user's forearm below the user's one hand, with the handle assembly operatively engaged by the user's one hand,
wherein the gripping portion is U-shaped, the U-shaped gripping portion opening in a direction that is generally orthogonal to the central axis of the elongate pole,
wherein the first operating component is pivotable around a first axis between the first position and the second position, the second operating component is pivotable around a second axis between the locked position and the released position, the first and second axes are substantially parallel to each other, and the first and second operating components are simultaneously engageable and movable respectively between: a) the first position and the second position; and b) the locked position and the released position by the user's one hand that is wrapped around the gripping portion,
wherein the U-shaped gripping portion has a first end and a second end spaced axially from each other a first distance with the first end closer to the distal region of the elongate pole than the second end, the U-shaped gripping portion including curved inside and outside surfaces each extending between the first and second ends, and the second operating component has a surface adjacent the curved outside surface that is engageable by the palm region of the user's one hand with the palm region of the user's one hand engaging the curved outside surface adjacent to the second end of the U-shaped gripping portion,
the second operating component in the locked position projecting from the curved outside surface from a midpoint location approximately midway between the first and second ends of the gripping portion towards the second end of the gripping portion over a majority of a lengthwise extent of the curved outside surface between the midpoint location and the second end of the gripping portion,
the second operating component engageable and movable from the locked position, wherein the second operating component projects from the curved outside surface, to the released position by pressing the second operating component.

22. The powered apparatus according to claim 21 wherein the curved outside surface extends substantially fully to the second end of the U-shaped gripping portion.

23. The powered apparatus according to claim 21 wherein the handle assembly is operatively engageable by a user's one hand on a user's one forearm with the user's one forearm in first and second different orientations wherein with the user's wrist substantially unbent, the length of the user's forearm is turned through approximately 90° between the first and second orientations.

24. A powered apparatus comprising:
an elongate pole having a length, a lengthwise central axis, and axially spaced proximal and distal regions;
a tool at the distal region;
a drive on the elongate pole for operating the tool;
a first operating component that is operatively connected to the drive and is repositionable between a first position and a second position to thereby change a state of the drive;
a second operating component that is repositionable between: a) a locked position wherein the first operating component is prevented from being moved from the first position into the second position; and b) a released position wherein the first operating component can be changed from the first position into the second position;
a handle assembly that can be operatively engaged by a user's one hand wherein the user's one hand can: a) maintain the second operating component in the released position; and b) change the first operating component from the first position into the second position,
the handle assembly disposed at the proximal region and comprising a gripping portion with an extent that can be grasped by the user's one hand at a plurality of different locations along the extent of the gripping portion including at a first location in a manner wherein with the elongate pole vertically oriented a majority of a vertical weight force component of the apparatus is directed generally parallel to the length of a user's forearm below the user's one hand, with the handle assembly operatively engaged by the user's one hand, wherein the gripping portion is U-shaped, the U-shaped gripping portion opening in a direction that is generally orthogonal to the central axis of the elongate pole and having first and second spaced ends, wherein the first end is closer to the distal region of the elongate pole than the second end, the U-shaped gripping portion including a curved outside surface extending between the spaced ends of the gripping portion, the second operating component in the locked position projecting from the curved outside surface from a midpoint location approximately midway between the spaced ends of the gripping portion over a majority of a lengthwise extent of the curved outside surface between the midpoint location and the second end of the gripping portion so that the second operating component can be engaged and moved by the user's one hand to the released position.

* * * * *